(12) United States Patent
Loomans

(10) Patent No.: US 8,366,125 B2
(45) Date of Patent: Feb. 5, 2013

(54) WILD GAME CART

(76) Inventor: Timothy L. Loomans, Oakfield, WI (US)

( * ) Notice: Subject to any disclaimer, the term of this patent is extended or adjusted under 35 U.S.C. 154(b) by 648 days.

(21) Appl. No.: 12/416,652

(22) Filed: Apr. 1, 2009

(65) Prior Publication Data
US 2010/0253023 A1    Oct. 7, 2010

(51) Int. Cl.
*B62B 3/04* (2006.01)
(52) U.S. Cl. .................. 280/47.17; 280/47.131
(58) Field of Classification Search ............. 280/47.17, 280/47.38, 47.131, 47.16, 47.3, 47.31, 63, 280/DIG. 6, 47.23, 47.26
See application file for complete search history.

(56) References Cited

U.S. PATENT DOCUMENTS

| | | | | |
|---|---|---|---|---|
| 120,478 A * | 10/1871 | Asbile | 280/7.17 |
| 237,696 A * | 2/1881 | Pletsch | 280/47.17 |
| 528,251 A * | 10/1894 | Grenier | 280/43.24 |
| 556,616 A * | 3/1896 | Carmichael | 280/47.17 |
| 577,471 A * | 2/1897 | Ward | 414/498 |
| 597,337 A * | 1/1898 | Stouffer | 280/47.17 |
| 600,476 A * | 3/1898 | Burt | 280/43.24 |
| 602,504 A * | 4/1898 | Garver | 280/43.24 |
| 605,316 A * | 6/1898 | Kneeland | 280/43.24 |
| 630,689 A * | 8/1899 | Gries | 280/47.33 |
| 752,190 A * | 2/1904 | Tieman | 280/47.23 |
| 944,291 A * | 12/1909 | Spangler | 280/47.18 |
| 1,052,953 A * | 2/1913 | Peirce | 105/143 |
| 1,245,004 A * | 10/1917 | Mayfield | 280/7.17 |
| 1,255,128 A * | 2/1918 | Bayley | 280/43.24 |
| 1,735,527 A * | 11/1929 | Cwik | 280/43.24 |
| 2,035,535 A * | 3/1936 | Colmorgen | 280/47.23 |
| 2,228,066 A * | 1/1941 | Tashbook | 280/47.17 |
| 2,405,674 A * | 8/1946 | Anderson et al. | 280/659 |
| 2,497,240 A * | 2/1950 | Sherer | 280/47.33 |
| 2,571,595 A * | 10/1951 | McLeary | 280/47.23 |
| 2,598,261 A * | 5/1952 | Eduard | 280/47.17 |
| 2,624,588 A * | 1/1953 | Jones | 280/9 |
| 2,706,568 A * | 4/1955 | Easterday | 414/457 |
| 2,855,061 A * | 10/1958 | Lilienthal et al. | 180/19.1 |
| 2,869,661 A * | 1/1959 | Fernandez | 180/19.1 |
| 2,979,338 A * | 4/1961 | Dwyer | 280/47.3 |
| 2,992,834 A | 7/1961 | Tidwell | |
| 3,104,890 A * | 9/1963 | Hill | 280/659 |
| 3,222,100 A * | 12/1965 | Lindzy | 296/20 |
| 3,236,537 A | 2/1966 | Eckman | |
| 3,580,346 A * | 5/1971 | McLaren | 180/19.1 |
| 3,820,807 A * | 6/1974 | Curran | 280/47.3 |
| 3,907,323 A | 9/1975 | Knapp et al. | |
| 4,052,080 A * | 10/1977 | Hedderich et al. | 280/47.26 |
| 4,061,349 A * | 12/1977 | Stahl | 280/47.2 |
| 4,063,744 A * | 12/1977 | Fraser | 280/42 |
| 4,171,139 A * | 10/1979 | Cockram | 280/652 |
| 4,435,115 A * | 3/1984 | Orstad et al. | 414/490 |
| 4,471,996 A * | 9/1984 | Primeau | 298/3 |

(Continued)

*Primary Examiner* — Katy M Ebner
*Assistant Examiner* — Brodie Follman
(74) *Attorney, Agent, or Firm* — Charles S. Sara, Esq.; DeWitt Ross & Stevens, S.C.

(57) ABSTRACT

A cart for transporting game, such as a large animal carcass, across rough and obstructed terrain is provided. The cart includes a frame forming a cart basket and a rear wheel and a front wheel (or other ground contacting structures, such as skids) that are aligned along the axis of the cart to provide for easy maneuverability. The frame of the cart is wedge shaped, to facilitate moving the cart through tall grass, brush, branches, etc. A low center of gravity design provides for greater operator control.

6 Claims, 11 Drawing Sheets

U.S. PATENT DOCUMENTS

| | | | | |
|---|---|---|---|---|
| 4,666,170 A | * | 5/1987 | Vasa | 280/47.19 |
| 4,789,180 A | * | 12/1988 | Bell | 280/652 |
| 4,869,517 A | * | 9/1989 | Smith | 280/47.3 |
| 5,169,164 A | * | 12/1992 | Bradford | 280/35 |
| 5,222,757 A | * | 6/1993 | Magyar | 280/653 |
| 5,282,520 A | | 2/1994 | Walker | |
| 5,295,556 A | * | 3/1994 | Mullin | 182/187 |
| 5,330,212 A | * | 7/1994 | Gardner | 280/40 |
| 5,427,390 A | * | 6/1995 | Duncan et al. | 280/8 |
| D363,585 S | | 10/1995 | Crossman et al. | |
| 5,607,174 A | * | 3/1997 | Ambrogio | 280/653 |
| 5,620,193 A | | 4/1997 | Dschaak | |
| 5,645,292 A | * | 7/1997 | McWilliams et al. | 280/494 |
| 5,692,761 A | * | 12/1997 | Havlovitz | 280/33.994 |
| 5,740,882 A | | 4/1998 | Griffith et al. | |
| 5,903,997 A | | 5/1999 | Jacob | |
| 6,009,694 A | * | 1/2000 | Moore et al. | 56/12.7 |
| D424,266 S | * | 5/2000 | McIntyre | D34/24 |
| 6,065,555 A | * | 5/2000 | Yuki et al. | 180/19.1 |
| 6,173,799 B1 | * | 1/2001 | Miyazaki et al. | 180/19.3 |
| 6,260,864 B1 | * | 7/2001 | Smith | 280/47.26 |
| 6,341,787 B1 | | 1/2002 | Mason | |
| 6,357,824 B1 | | 3/2002 | Whitacre | |
| 6,375,200 B1 | | 4/2002 | Harter | |
| 6,561,529 B2 | | 5/2003 | Darling, III | |
| 6,685,198 B1 | * | 2/2004 | Hartman | 280/1.5 |
| 6,688,635 B1 | | 2/2004 | Watts | |
| 6,793,236 B1 | * | 9/2004 | Mitchell | 280/652 |
| 6,811,179 B2 | | 11/2004 | Woods | |
| 7,025,362 B1 | | 4/2006 | Gomez | |
| 7,641,204 B2 | * | 1/2010 | Rye et al. | 280/47.31 |
| 7,891,676 B1 | * | 2/2011 | Putman | 280/47.17 |
| 7,950,687 B2 | * | 5/2011 | Ludlow | 280/653 |
| 2003/0205885 A1 | * | 11/2003 | Woods | 280/652 |
| 2004/0084864 A1 | | 5/2004 | Casey et al. | |
| 2004/0130112 A1 | | 7/2004 | Doyle | |
| 2007/0194560 A1 | | 8/2007 | Zink | |
| 2009/0179393 A1 | * | 7/2009 | Ludlow | 280/47.31 |
| 2010/0044125 A1 | * | 2/2010 | Witzigman | 180/19.3 |

* cited by examiner

WILD GAME CART

FIELD OF THE INVENTION

This invention pertains generally to carts and similar devices for transporting objects, and, more particularly, to game carts for transporting an animal carcass through a wilderness area.

BACKGROUND OF THE INVENTION

A successful hunt is the ultimate reward for a hunter of large animals, such as deer and the like. However, the hunter's happiness, looking down at the animal he has just taken, is often dampened, at least somewhat, by the prospect of now having somehow to get that large animal carcass out of the remote location in which he often finds himself.

Over the years various contraptions have been developed in order to assist the successful hunter in transporting his take through various types of wilderness. One of the more successful solutions to this problem has been the use of carts specifically designed to carry a large animal carcass. However, currently available game carts of this type have several significant limitations that have hindered their use and broad acceptance by hunters. A typical feature of such known game carts is large wheels, which allows the cart to be moved more easily over various types of rough ground. However, the use of such large wheels often results in a high center of gravity, which makes the cart difficult to maneuver and even to retain upright when carrying a large animal carcass. Also, such carts often will work well in open fields, but will become caught up in tall grass, brush, and tree branches when passing through such conditions, where there is very little room for a cart to pass clearly.

What is desired, therefore, is an improved game cart for transporting an animal carcass or other objects that is both easy to maneuver and control when passing over rough terrain and that will cut through tall crass, brush, branches, and other wilderness obstructions without becoming caught up.

SUMMARY OF THE INVENTION

The present invention provides a cart that is specifically designed for hauling wild game carcasses from the woods and other remote and rough locations. For example, a game cart in accordance with the present invention is particularly adapted to hauling deer after a hunt, but may be used for hauling other types of game or other objects as well. A game cart in accordance with the present invention allows a hunter to hunt in more remote areas, where game may be more plentiful, such as remote marshes, rocky hills, and forests. The game cart may be used both to transport hunting equipment into such areas for the hunt and to haul the equipment and downed game from the remote location.

Advantages of a cart in accordance with the present invention over other known carts include a wedge shaped frame, to allow the cart to get through high brush and other obstructions more easily, and a low center of gravity in combination with in-line tandem wheels for control and easy maneuverability.

A game cart in accordance with the present invention is based on a tubular frame formed in a double wedge shaped configuration, such that the front end of the frame is narrower than the rear end of the frame and the bottom of the frame is narrower than the top of the frame. This provides the game cart with a streamlined design having a "knife-edge" shape for parting and deflecting branches, brush, high grass, and other such obstacles. Thus, the cart shape itself helps to clear a path from a remote and difficult location.

The front wheel of the cart is positioned forward from the cart frame such that the lower end of the cart basket may be positioned low to the ground. This provides the cart with a low center of gravity. The low center of gravity is a true advantage that allows for easy maneuverability of the game cart with a game carcass positioned thereon by providing better balance over rough terrain. For example, with game, e.g., a deer carcass, positioned at the lowest point in the cart basket, the weight of the carcass is centered very low to the ground, but still high enough to allow easy maneuverability.

The preferred in-line wheels also make the cart easy to maneuver. The wheels are separated from each other along the axis of the cart to add to the balance and maneuverability. In alternative embodiments, more than two wheels may be provided. For example, in addition to a front wheel positioned along the cart axis, two rear wheels may be provided and situated side-by-side in a tricycle fashion. Skids or other sliding devices could be provided in place of the wheels. The design also allows the cart to slide over rocks, logs, snow, etc. fairly easily.

A game cart in accordance with the present invention preferably may also include a brake, similar to a hand brake for a bicycle, to assist the operator in controlling the cart, e.g., especially when the cart is going down a hill.

A second handle bar preferably may be included on the front frame of the cart so that a second operator can help to move the cart by pulling or pushing on the handle bar. Alternatively, or additionally, a loop or hook for a rope or harness may be attached to the cart frame so that the second operator can pull on a rope or be fitted with a harness to help pull the cart.

The present invention also includes a carrier in conjunction with the cart. The carrier is designed to fit within a trailer hitch receptacle and comprises an elongated support bar having a first end and a second end, wherein the first end comprises a trailer hitch for attachment to the trailer hitch receptacle and the second end comprises a cylindrical shape, a rotating cylinder rotatably positioned on the second end, means to prevent the movement of the rotating cylinder, and a track for placement of the cart, wherein the track is secured to the rotating cylinder. The carrier further comprises at least one upright support connected to the elongated support bar, wherein the secured end of the restraining strap is secured to the upright support.

Other objects, features, and advantages of the invention will appear more fully from the following detailed description of the preferred embodiment of the invention made in conjunction with the accompanying drawings.

DETAILED DESCRIPTION OF THE INVENTION

Figure 1:
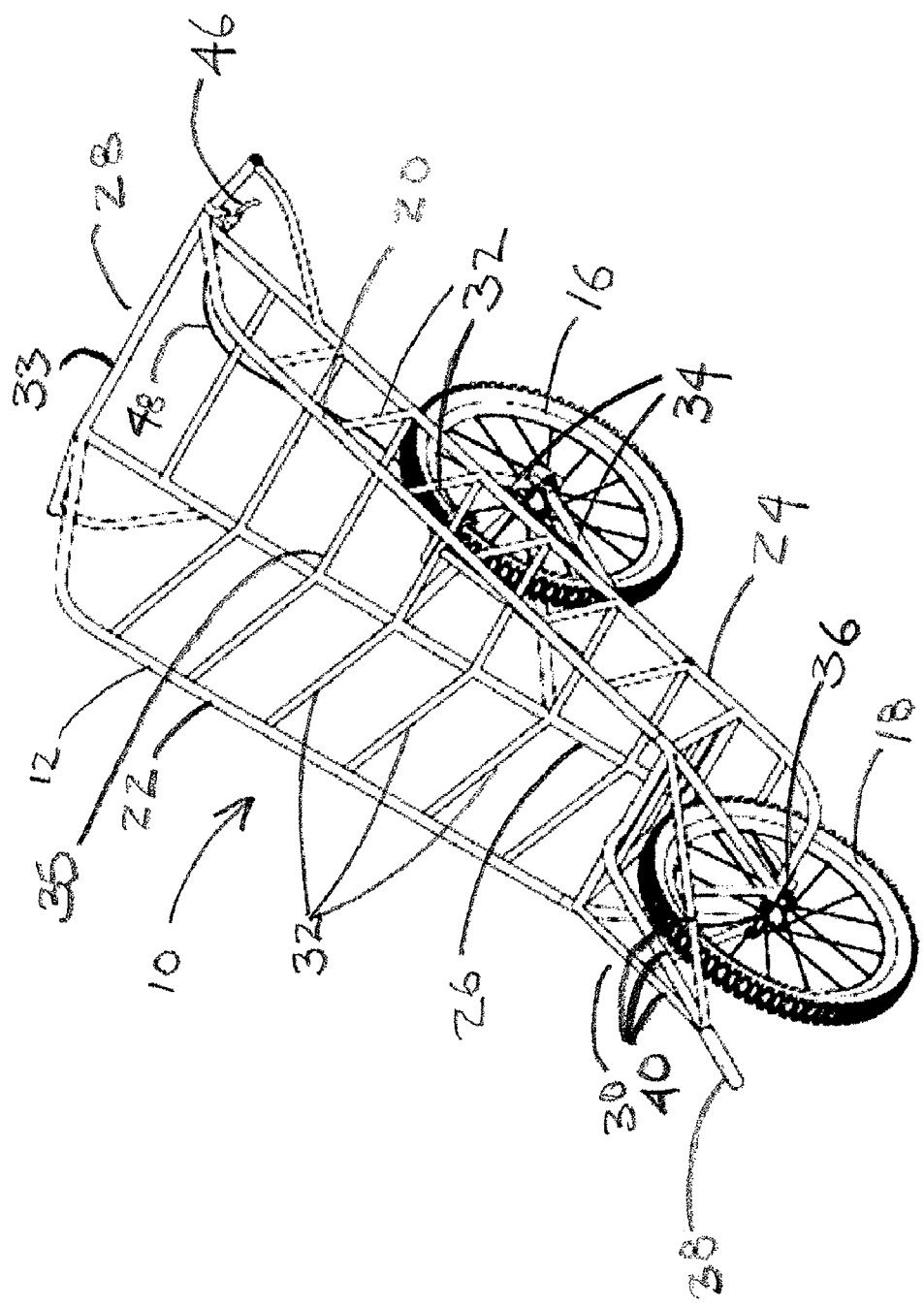
FIG. 1 is a perspective view of an exemplary game cart in accordance with the present invention.
Figure 2:
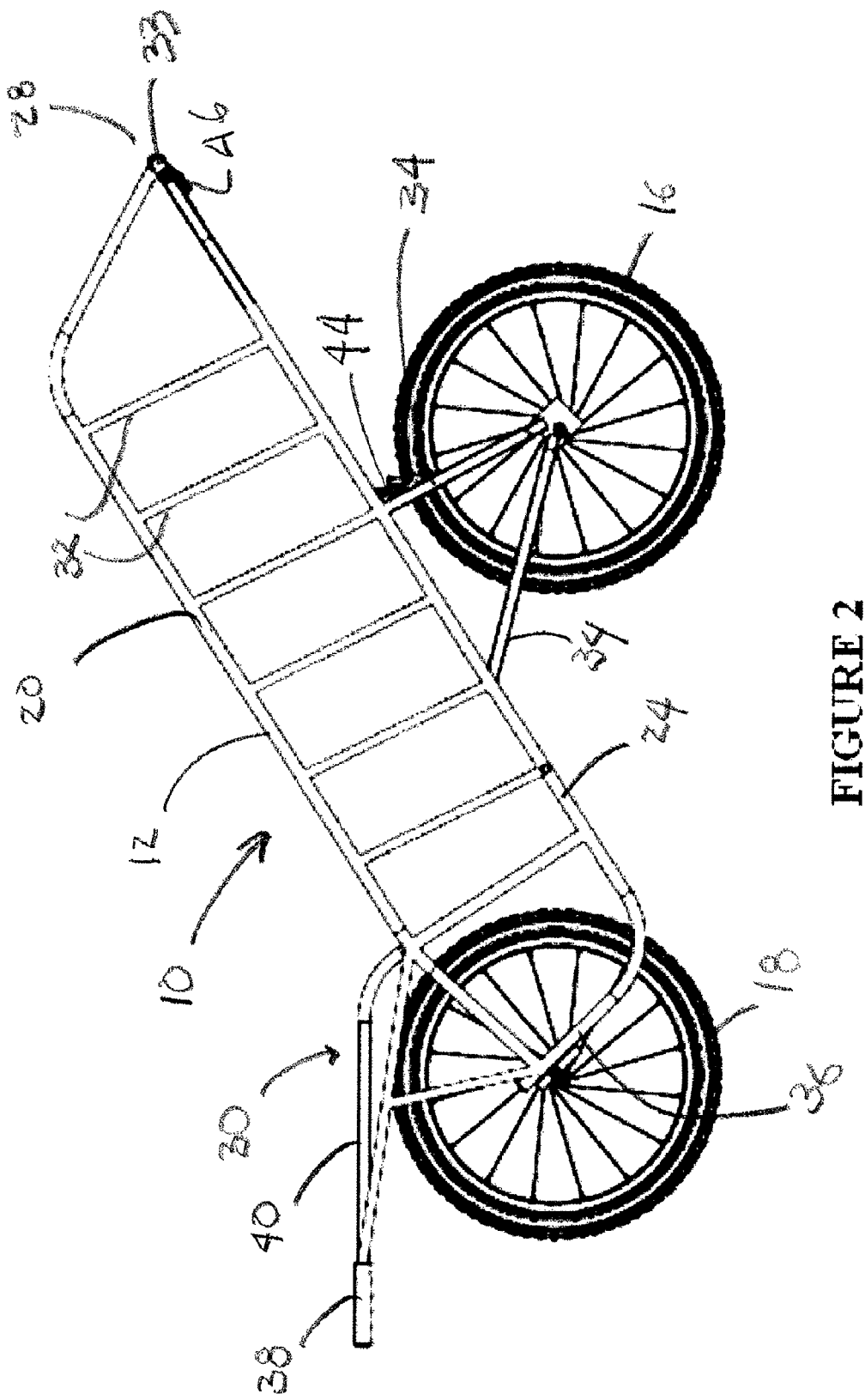
FIG. 2 is a side elevated view of the exemplary game cart of FIG. 1.
Figure 3:
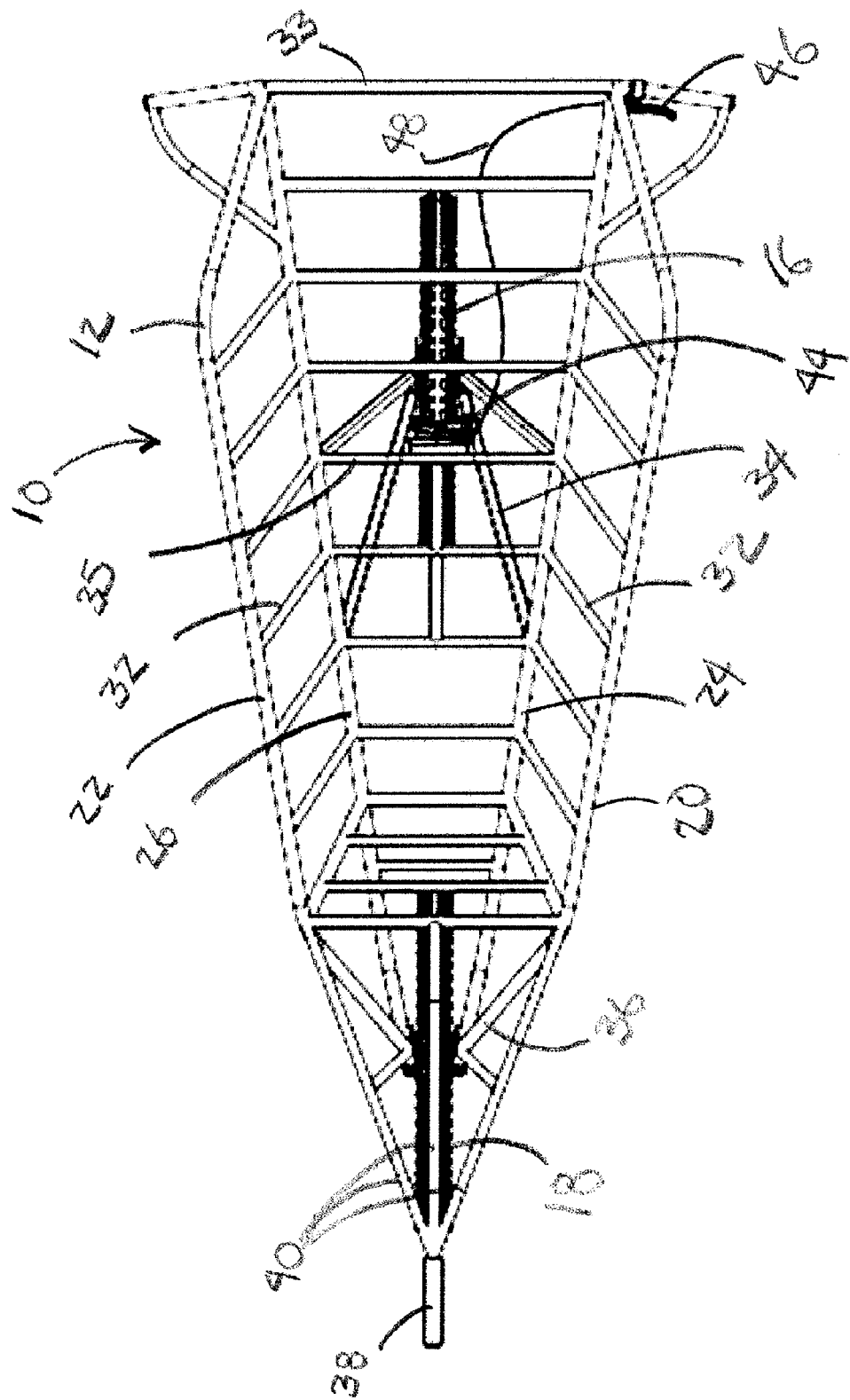
FIG. 3 is a top plan view illustration of the exemplary game cart of FIG. 2.
Figure 4:
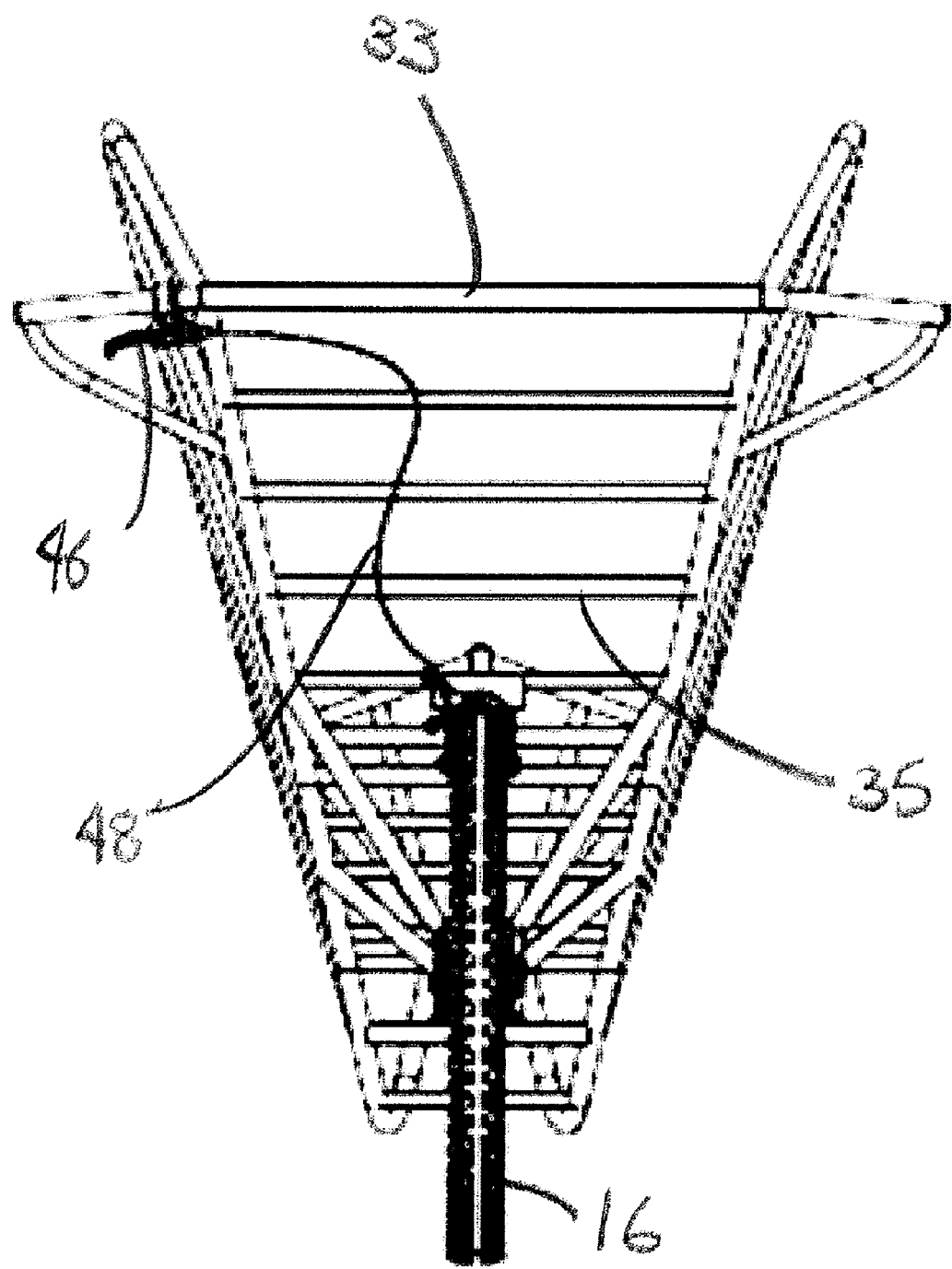
FIG. 4 is a rear view illustration of the exemplary game cart of FIG. 2.

An exemplary game cart 10 in accordance with the present invention will now be described in detail with reference to FIGS. 1-5. Although described herein with respect to the particular exemplary application of transporting a game carcass, such as a deer carcass, it should be understood that a game cart in accordance with the present invention may be used for many other applications and the transportation of many other objects. For example, a game cart in accordance with the present invention may be used most effectively to transport a person, such as an injured person, over rough terrain from a remote location.

A game cart 10 in accordance with the present invention includes three main structural components, a frame 12, at least one rear wheel 16, and a front wheel 18. Although not illustrated, it is within the scope of the present invention to include material positioned within the frame 12 to form a basket. The use of material positioned within the frame 12 to form a basket may be optional. Also, one or both of the rear 16 and front 18 wheels may be replaced by other ground-contacting structures for moving the game cart 10 across the ground, such as skids 112 (illustrated in FIG. 5) or other structures for sliding across the ground.

The shape of the frame 12 of a game cart 10 in accordance with the present invention is defined by four elongated longitudinal frame members, top left 20, top right 22, bottom left 24, and bottom right 26. The terms "left" and "right" are defined from the view of an operator of the cart, i.e., from the view of FIG. 4. The elongated frame members are positioned with respect to each other to form the frame 12 such that the top frame members 20 and 22 lie in the same plane but are separated from each other by a greater distance, e.g., approximately shoulder width, at a first or operator end 28 of the cart 10, and come together to be separated by a much shorter distance, e.g., a few inches, at the opposite or front end 30 of the cart 10. Thus, the top frame members 20 and 22 form a wedge shape, with the point of the wedge oriented toward the front end 30 of the cart 10. The bottom frame members 24 and 26 also lie in the same plane, but are positioned below the top frame members 20 and 22 in the frame 12. The bottom frame members 24 and 26 also are separated from each other by a greater distance at the operator end 28 of the cart 10 and come close together at the front end 30 of the cart, thereby also forming a wedge shape, with the point of the wedge oriented toward the front end 30 of the cart. Preferably, the separation between the bottom frame members 24 and 26 at the operator end 28 of the cart is less than the separation of the top frame members 20 and 22 at the operator end 28 of the cart 10.

With the bottom frame members 24 and 26 positioned below the top frame members 20 and 22, this gives the cart frame 12 a wedge shape both front to back, as discussed above (see FIG. 3), and also bottom to top (see FIG. 4), with the point of the wedge directed downward. The overall wedge shape of the cart frame 12 advantageously allows a cart 10 in accordance with the present invention to more easily cut through tall grass, brush, tree branches, and other such obstacles.

The cart frame structure 12 is completed by a plurality of cross-pieces 32 and center bars 35. The cross-pieces 32 connect the top left frame member 20 to the bottom left frame member 24 and the bottom right frame member 26 to the top right frame member 22. The center bars 35 connect the bottom left frame member 24 to the bottom right frame member 26. The cross-pieces 32 and the center bars 35 may be curved slightly along their length in order to provide for a more curved or rounded appearance for the upper surface of the cart basket.

The various frame members 20, 22, 24, and 26; cross-pieces 32; and center bars 35 preferably may be made of tubing of sufficient size and strength to support an animal carcass in the frame 12, and may be painted or otherwise treated to preserve both the appearance and functionality of the frame 12. It is within the scope of the present invention to use copper, steel, or aluminum tubing, although steel or aluminum tubing is preferred. Such tubing also may be coated or treated as desired to preserve the appearance and functionality of the frame 12.

It should be noted that the various frame members 20, 22, 24, and 26; cross-pieces 32; and center bars 35 may be formed separately and joined together in an appropriate manner, e.g., by welding, the use of appropriate fasteners, etc., or may be integrally formed in whole or in part. For example, cross-pieces 32 attached at the ends of the various frame members 20, 22, 24, and 26 may be integrally formed as part of those frame members 20, 22, 24, and 26. It should be understood that the various frame members 20, 22, 24, and 26; cross-pieces 32; and center bars 35 of a cart frame 12 in accordance with the present invention may also be made of any other appropriate material and joined together in any other appropriate manner. Furthermore, selected ones of the various frame members 20, 22, 24, and 26; cross-pieces 32; and center bars 35 may be made of separable pieces and/or coupled separably to the other parts of the frame 12, thereby allowing the frame 12 to be collapsible or foldable for easier transport and storage of the cart 10 when not in use.

A handle structure 33 preferably is provided at the operator end 28 of the frame 12. The preferred handle structure 33 preferably allows an operator to grasp and push the cart 10 with both hands. Any appropriate handle structure 33 may be provided, and such structure may be attached to the frame 12, or integrally formed as part of the frame 12, in any appropriate manner and using the same, or any other appropriate, material. For example, the handle structure 33 preferably may be implemented as a metal tube or bar that is attached to the bottom frame members 24 and 26 at the operator ends thereof and that extends outward from the frame 12 perpendicular to the axis thereof.

As discussed above, a durable and flexible material may be mounted on the various frame members 20, 22, 24, and 26; cross-pieces 32; and center bars 35 forming the cart frame 12 to form the cart basket with the frame 12. Any appropriate material may be used and attached to the frame 12 in any appropriate manner to form the basket. For example, a heavy duty canvas material may be used to form the basket and may be attached to the frame 12 using snaps or other types of fasteners that allow the basket to be removed from the frame 12 for cleaning or replacement. Other types of flexible materials, such as plastic sheet materials, may be used to form the basket, and may be removably or permanently attached to the frame 12. Alternatively, a more rigid material, such as rigid plastic, may be formed appropriately and attached to the frame 12 to form the basket.

In a preferred embodiment of a game cart 10 in accordance with the present invention, the use of a flexible or other material attached to the frame 12 to form the basket may be eliminated by increasing the number of cross-pieces 32 and center bars 35 provided between the frame members 20, 22, 24, and 26. By providing a plurality of cross-pieces 32 and center bars 35 between the frame members 20, 22, 24 and 26 that are separated from each other by only a few inches, and which extend substantially entirely along the length of the frame 12, an animal carcass positioned in the cart 10 will be supported adequately by the cross-pieces 32; center bars 35; and frame members 20, 22, 24 and 26 themselves. Thus, in this embodiment of the present invention, the plurality of cross-pieces 32; center bars 35; and frame members 20, 22, 24 and 26 form the cart basket, and the need for a separate material attached to the frame 12 to form the basket is eliminated. A preferred game cart 10 in accordance with the present invention having a frame 12 made of tubing (as discussed above) and having sufficient closely spaced cross-pieces 32 and center bars 35 such that a separate material to form the basket is eliminated, can be manufactured more easily, with lower manufacturing costs, i.e. labor and materials, and provides a lighter and cleaner looking cart 10.

The at least one rear wheel 16 preferably is attached to the frame 12 using appropriate rear wheel struts or other support structures 34. The rear wheel 16 preferably is positioned immediately below the frame 12 near the longitudinal (front-to-back) center thereof and along the axis thereof. Preferably only minimal spacing is provided between the rear wheel 16 and the frame 12 such that the rear wheel 16 rotates freely without contacting the frame 12 or basket but also such that the overall height of the cart 10 for a given wheel size is minimized. Preferably, a relatively large wheel with an appropriate tire is used for the rear wheel 16. For example, a wheel and tire of the type used for a cross-country bicycle would be appropriate for this application.

In an alternative embodiment, more than one wheel of this type may be used in place of the single rear wheel 16. In such a case, for example, two wheels would be attached to the frame 12 using appropriate support structures and would be positioned side-by-side near the longitudinal center of the frame 12. The use of two rear wheels would provide greater support for a game cart in accordance with the present invention, making it easier to keep upright while in use.

The front wheel 18 is attached to the front end of the frame 12 via an appropriate front wheel support structure 36. The front wheel 18 preferably may be implemented using the same type of wheel and tire as the rear wheel 16. Any appropriate support structure 36 that positions the front wheel 18 with respect to the frame 12 in the manner described below may be employed. The front wheel support structure 36 may be implemented in part as an extension of the frame 12, e.g., as an extension of one or more of the frame members 20, 22, 24, and 26.

The front wheel 18 preferably is positioned along the axis of the cart 10, in alignment with the rear wheel 16. The front wheel support structure 36 extends forward and upward from the front end of the frame 12 such that the front wheel 18 is positioned in front of the frame 12 at the front end 30 of the cart 10 and such that the frame 12 of the cart extends upward at an angle from the front end 30 to the operator end 28 end thereof, with the lowest point of the frame 12 positioned at approximately the same distance from the ground as the center of the front wheel 18 (when the cart 10 is on a flat surface). For example, the frame 12 of the cart 10 may extend upward at an angle of between approximately 30° to 40°, with the height of the bottom of the frame 12 positioned no higher than, and preferably below, the height of the center of the front wheel 18 from the ground. This positioning of the front wheel 18 allows the center of gravity of the cart 10 to be brought as low to the ground as possible when a carcass is positioned in the frame 12 with the largest part of the animal pushed down into the lowest point of the frame 12. This low center of gravity, in combination with the aligned front 18 and rear 16 wheels, provides for a game cart with great stability as well as maneuverability. In combination with the double wedge shape of the frame 12, a game cart in accordance with the present invention is easily moved and maneuvered across difficult and obstructed wilderness terrain.

Figure 5:
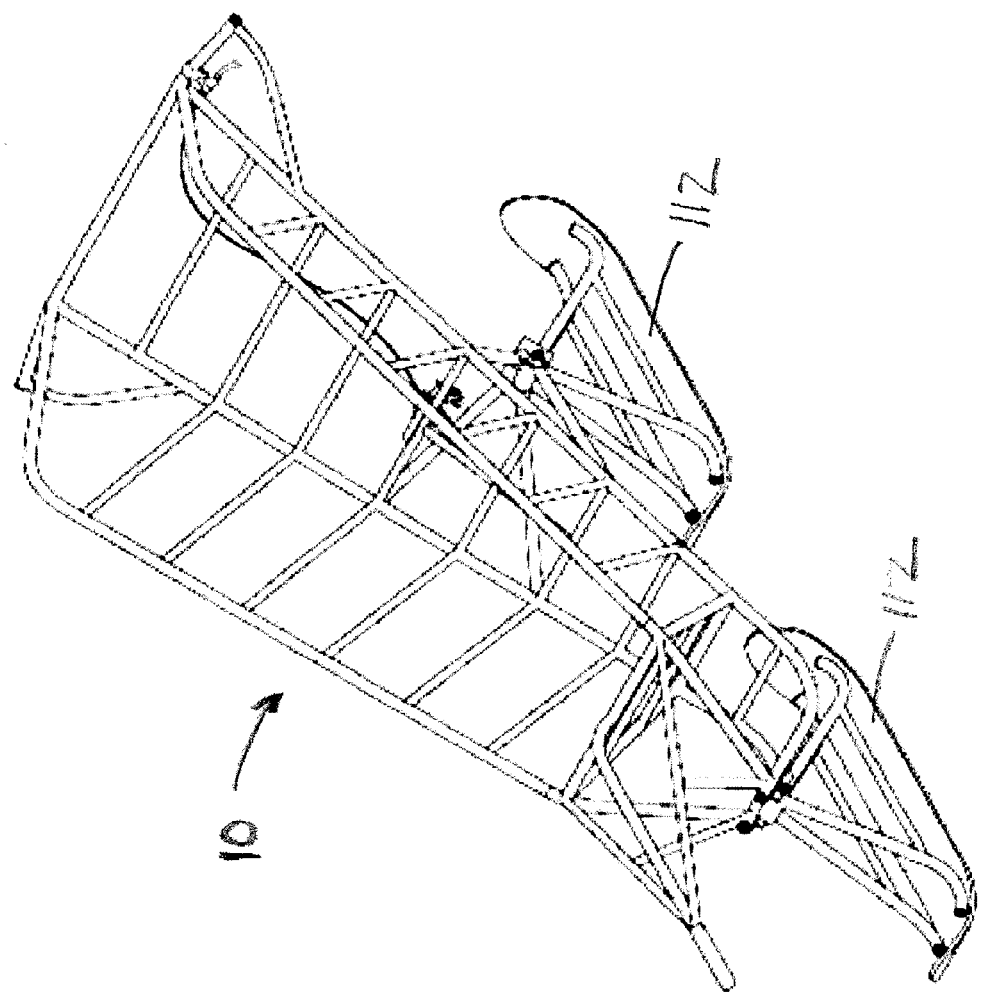
FIG. 5 is a perspective view of an alternative embodiment of the game cart of FIG. 1.

It should be noted that either or both of the rear 16 and front 18 wheels may be replaced by other ground contacting structures for moving the game cart 10 in accordance with the present invention across different types of terrain. For example and as illustrated in FIG. 5, one or both of the rear 16 and front 18 wheels may be replaced by skids 112 or other sliding devices or structures that allow the cart 10 to slide more easily over snow, ice, rocks, logs, etc.

A second handle or bar structure 38 may be provided at the front end 30 of the cart 10 to allow a second operator to help move the cart 10 by pushing or pulling on the bar 38. The second handle or bar structure 38 preferably extends in front of, as illustrated in FIGS. 1-5, or may extend perpendicular to the axis, of the cart 10 and is positioned at the front end 30 of the cart 10 forward of the front wheel 18 by an appropriate support structure 40 that connects the second handle or bar structure 38 to the cart frame 12. The bar 38 and support structure 40 preferably may be formed of the same material as the frame 12, and in a similar manner, or using any other appropriate material and/or method. Appropriate grips, e.g., plastic or rubber grips, may be provided on the end(s) of the second handle or bar structure 38, if desired.

If desired, a rope or harness (not illustrated) can be easily attached to the cart 10 by using the support structure 40 where it meets with the handle bar 38 at position 42 so that a second operator can help to move the cart by pulling on the rope or harness attached to the support structure 40.

The wheels 16 and 18 of a cart 10 in accordance with the present invention preferably are free spinning. When pushing the cart 10 down hill, or in other similar situations, particularly with a large load in the cart 10, it can be hard to control the forward movement of the cart 10. In order to provide better control in such situations, a brake mechanism may be provided. For example, the brake mechanism may be implemented using a conventional friction brake 44 (such as commonly used on bicycles) mounted on the rear wheel 16 (see FIGS. 2 and 3). The brake 44 presses on the frame of the wheel 16 to slow movement of the cart 10 when the brake 44 is actuated. The brake 44 may be actuated by a brake handle 46 that is mounted to the cart handle structure 33, within easy reach of an operator, and that is coupled to the brake 44 by an appropriate brake cable 48 (see FIGS. 1-4). It should be understood that other appropriate break mechanisms also may be used, such as disk brake mechanisms.

Reference is now made to FIGS. 6-11 for a cart carrier 200 designed to fit within a trailer hitch receptacle (not illustrated) generally placed below the rear bumper 202 of a motor vehicle 204. The cart carrier 200 comprises an elongated support bar 206 having at one end a trailer hitch component 208 for attachment to the trailer hitch receptacle. The proximal end 210 of the support bar 206 is cylindrical in design and designed to rotatably fit within the cart carrier rotating cylinder 212. A lock pin 214 is designed to lock the rotating cylinder 212 in a set, i.e., horizontal, position by placement of the lock pin 214 through continuous openings 216 of the proximal end 210 of the support bar 206 and the rotating cylinder 212.

Secured to the rotating cylinder 212 by spot weld, bolts, or other means is an elongated U shaped track 220 for placement of the cart 10. The track 220 is defined by parallel opposing walls 222, 224 and a floor 226 upon which the wheels 16, 18 or skids 112 of the cart 10 rest when the cart 10 is positioned on the cart carrier 200. The track 220 is further defined by wheel locks 230, 232 which are removably attached to the floor 226 of the track 220. The wheel locks 230, 232 aid to position the cart 10 when the cart 10 is in place on the cart carrier 200. In addition, auxiliary lock pins 234, 236 are placed on the track 220 through openings in the walls 222, 224. The lock pins 234, 236 aid to further immobilize the cart 10 when the cart 10 is in place on the track 220 of the cart carrier 200. The cart carrier 200 is further defined by upright supports 240, 242 which are attached to a crossbar 244 and further buttressed by support brackets 246, 248. The crossbar 244 is fixedly attached to the elongated support bar 206 by glue, spot weld, or other means known to the art.

At the upper ends of the upright supports 240, 242 are connectors 250, 252 which are designed to attach flexible restraining straps 254, 256. The flexible restraining straps 254, 256 are preferably made of canvas, rope, rubberized material, or the like and are designed to further restrain the cart 10 when it is in place on the track 220 of the cart carrier 200. This is accomplished by weaving the flexible strap 254, 256 over or through the cart 10 when the cart 10 is in place on the cart carrier 200. The straps 254, 256 may then be fixed in place by means of locking mechanisms 258, 260. As illustrated, the locking mechanisms 258, 260 are designed to allow the flexible restraining straps 254, 256 to pass through the locking mechanisms in order to tighten the flexible straps over the cart 10 thereby further restraining the cart 10 within the track 220 of the cart carrier 200.

Figure 6:
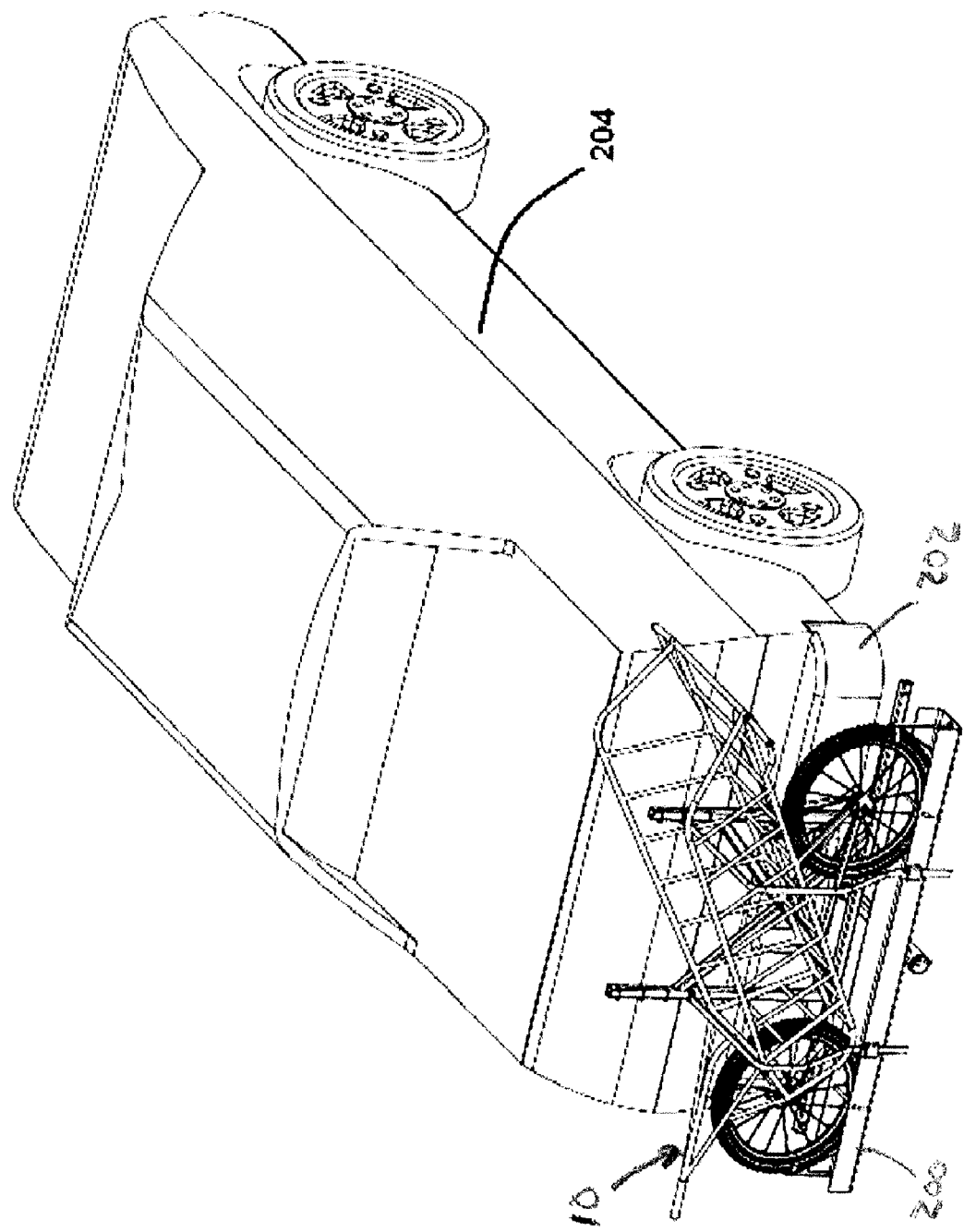
FIG. 6 is a perspective view of one embodiment of a cart carrier for transporting the game cart of the present invention.
Figure 7:
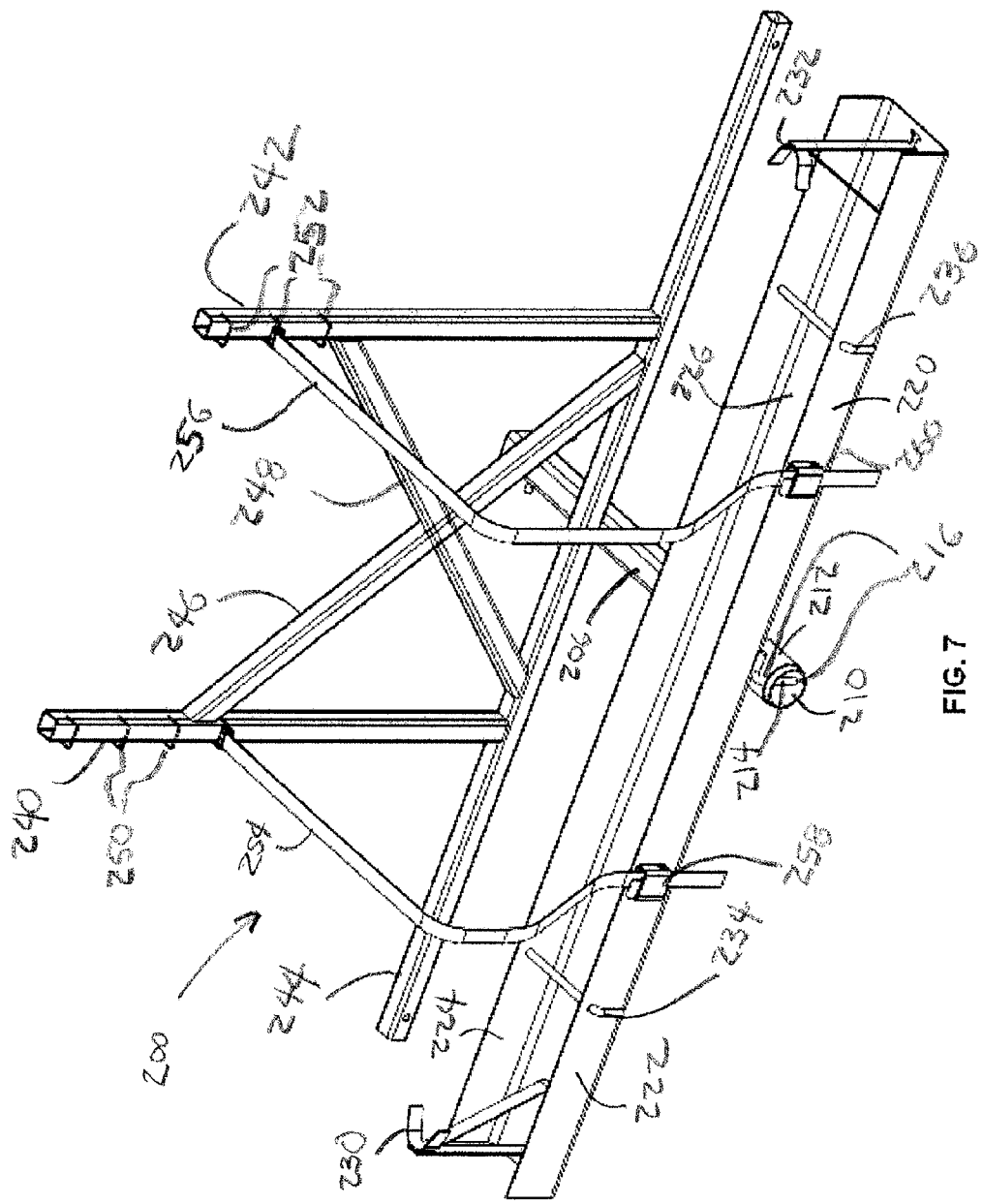
FIG. 7 is a perspective view of the cart carrier without the game cart.
Figure 8:
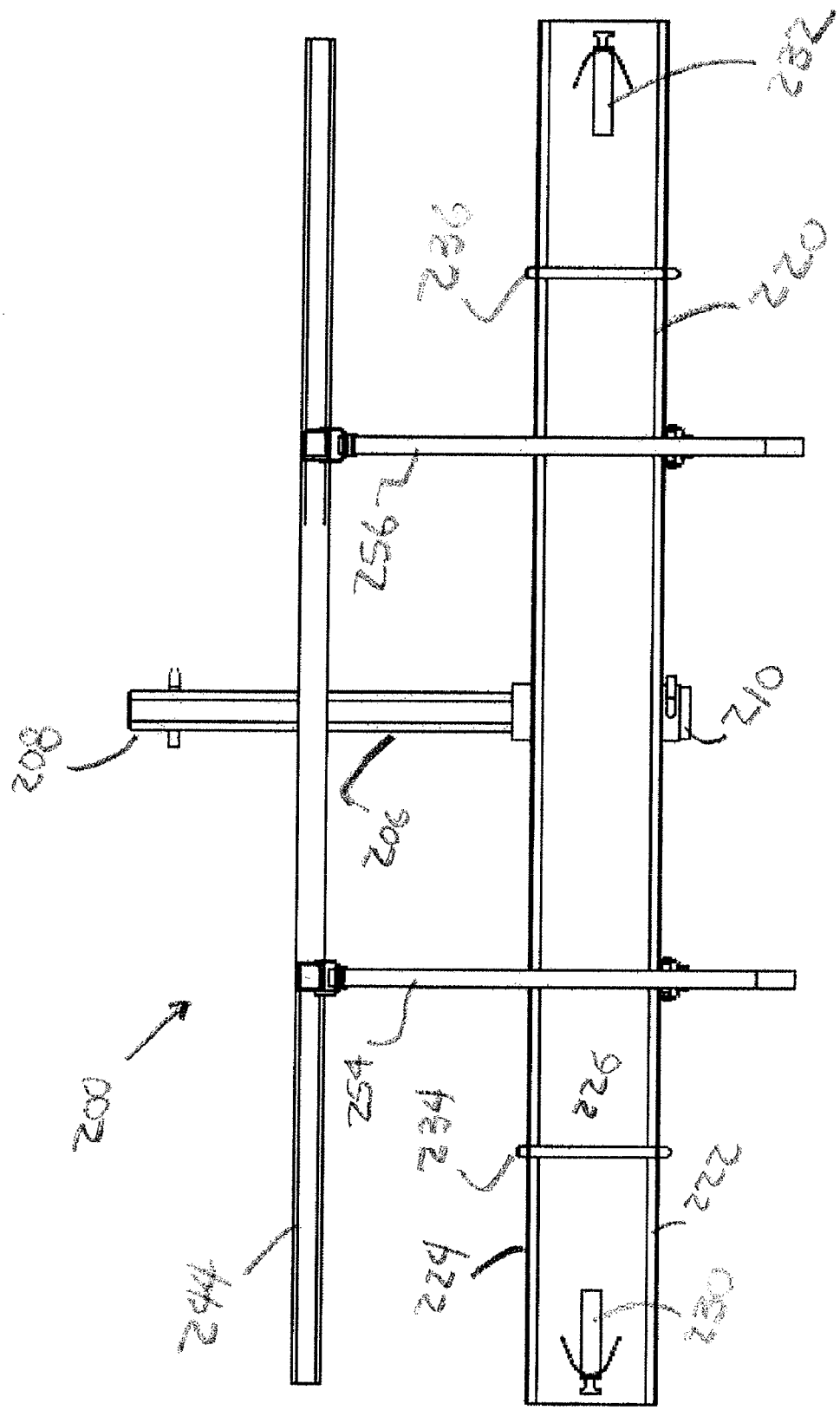
FIG. 8 is a top plan view of the cart carrier of FIG. 7.
Figure 9:
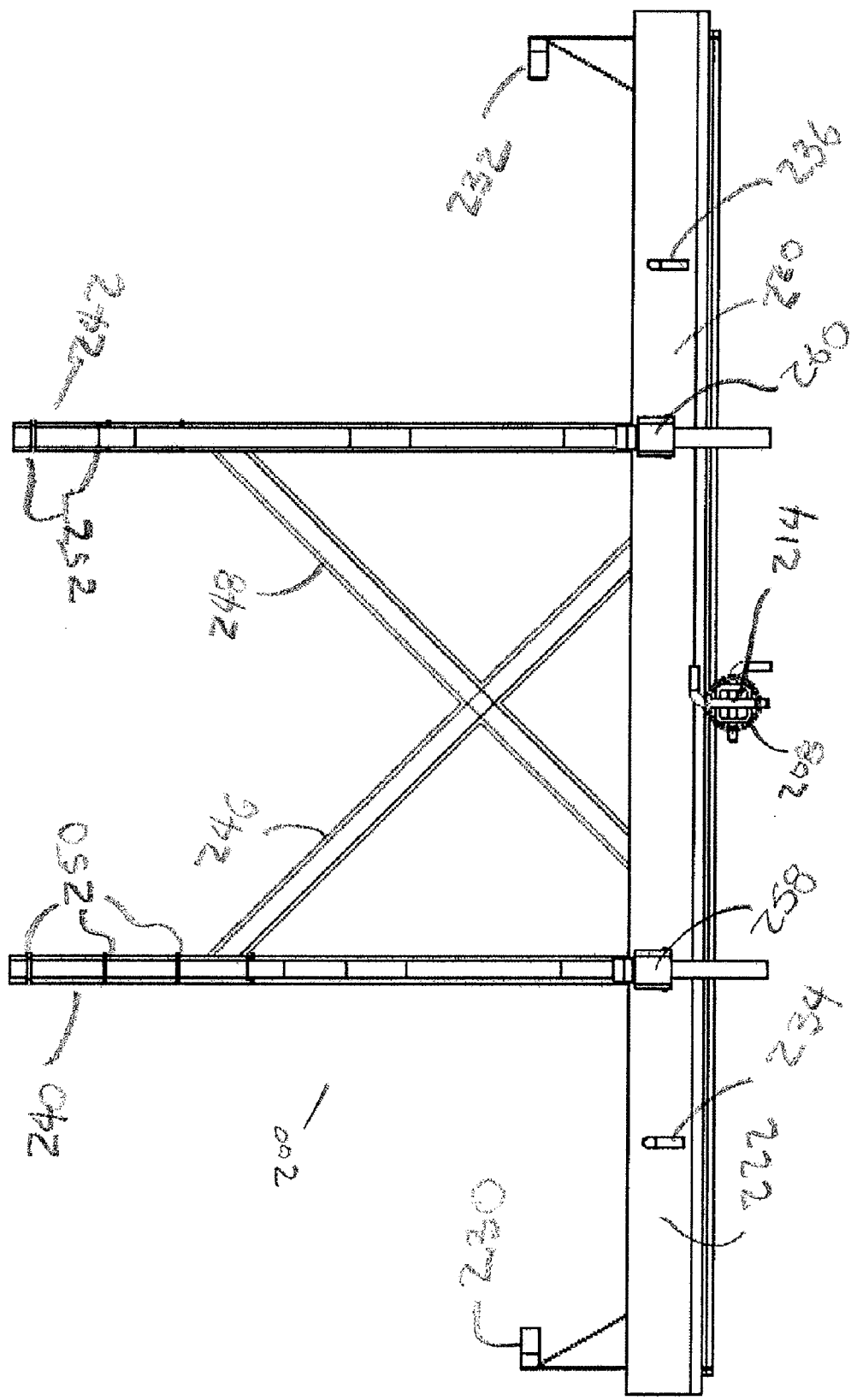
FIG. 9 is a front plan view of the cart carrier of FIG. 7.
Figure 10:
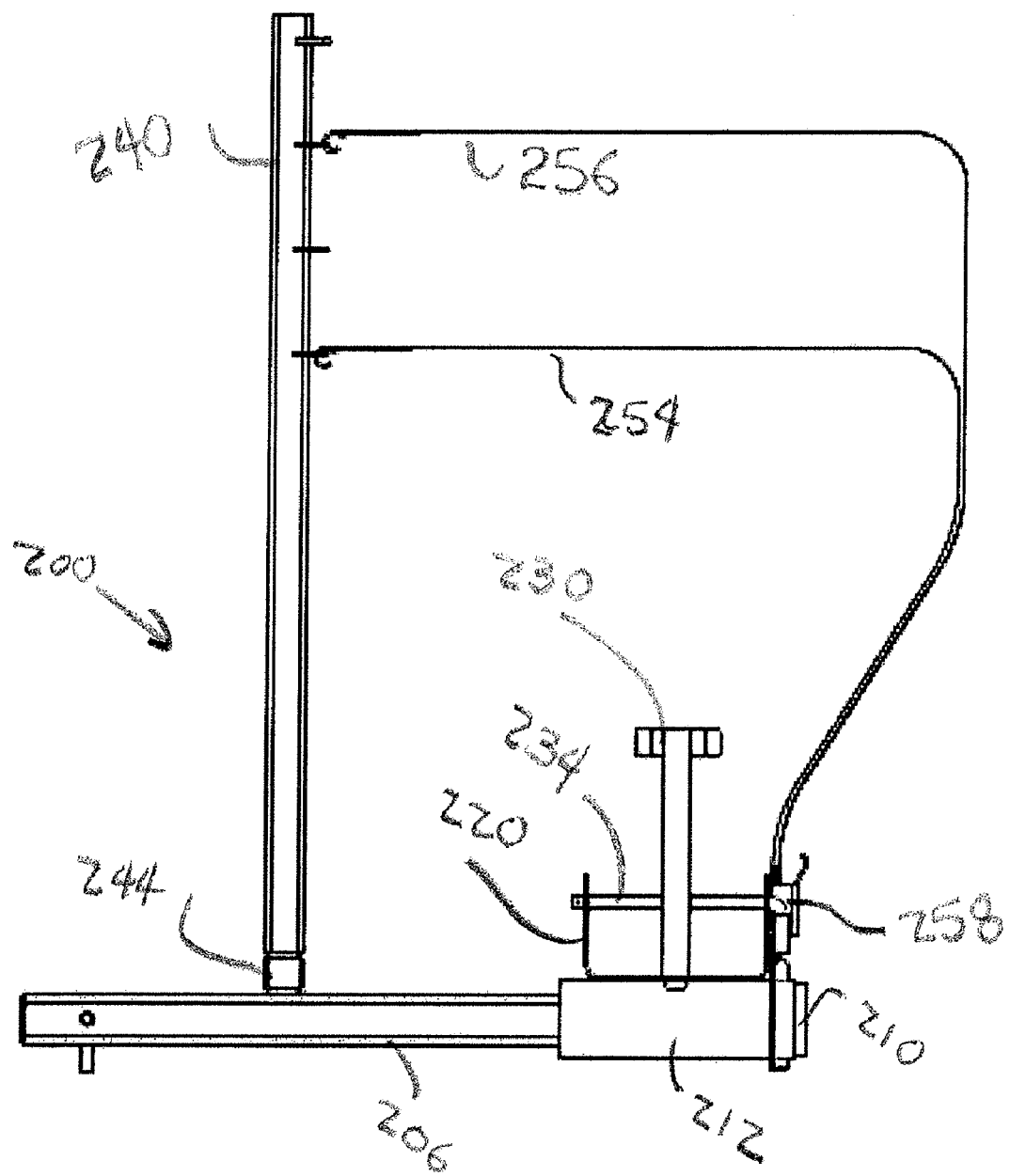
FIG. 10 is a side elevated view of the cart carrier of FIG. 7.
Figure 11:
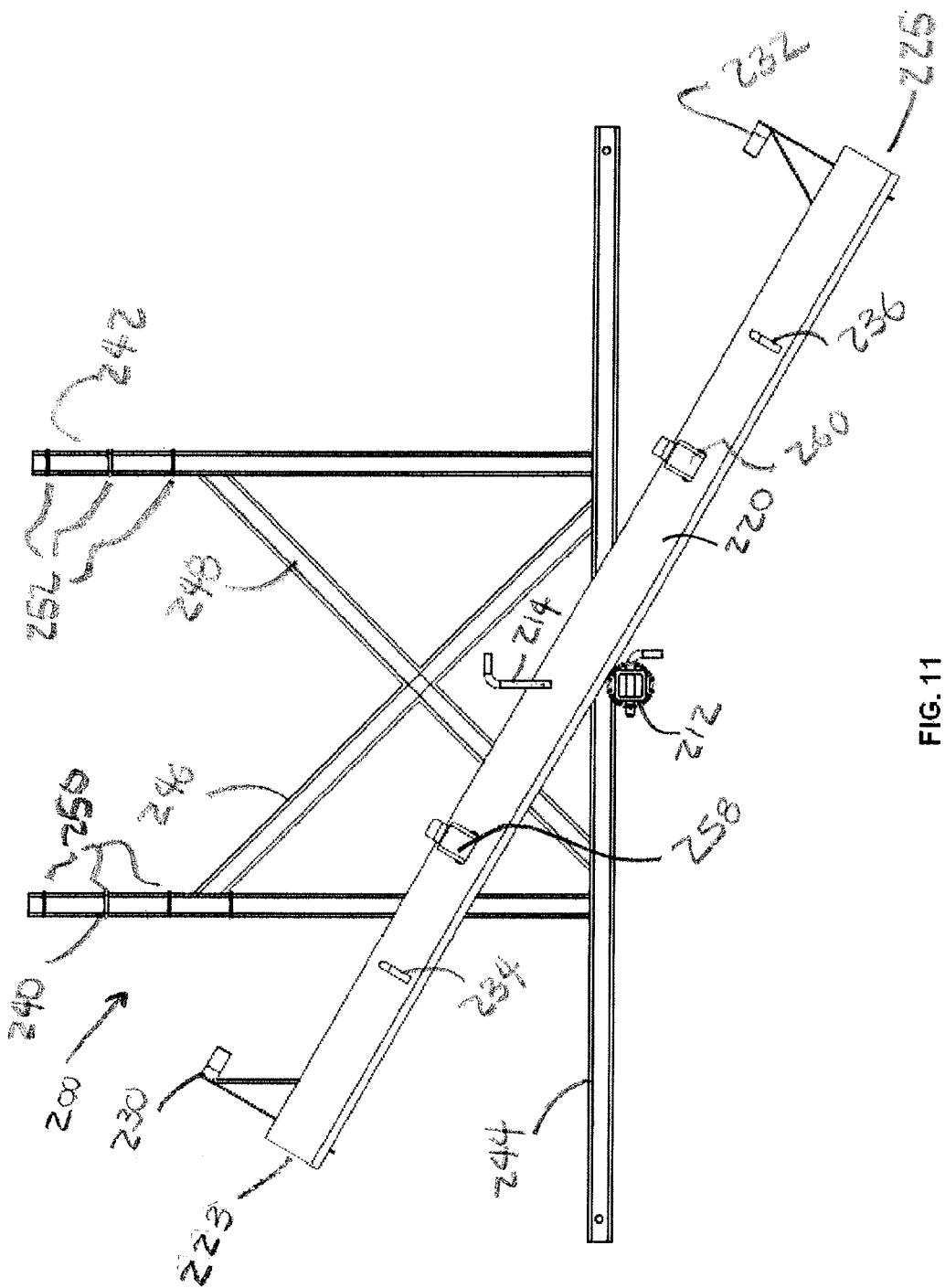
FIG. 11 is a side elevated view of the cart carrier of the present invention illustrating the track of the cart in operation.

Reference is now made to FIG. 11 for an illustration of how the cart 10 is loaded or unloaded on the cart carrier 200. The cart carrier 200 is positioned on the motor vehicle 204 by placement of the trailer hitch component 208 within the trailer hitch receptacle of the motor vehicle 204 (as illustrated in FIG. 6). At this point, the locking pin 214 is removed from the combination proximal end 210 of the support bar 206 and the rotating cylinder 212 upon which the track 220 is attached. With the removal of the locking pin 214, the track 220 is able to rotate on an axis provided by the rotating cylinder 212 such that one or the other end 223, 225 of the track 220 can be lowered to the surface or ground. At this point, the wheel lock 232 (or 230 if the end 223 is lowered to the ground) is removed from the floor 226 of the track 220. In addition, the locking pins 234, 236 are removed from the walls 222, 224 of the track 220. The cart 10 may then be wheeled onto the floor 226 of the track 220 until the front wheel 18 (or skid 112) abuts the wheel lock 230 (or wheel lock 232 depending upon which end of the track is on the surface or ground). At this point, the wheel lock 232 is replaced to prevent the cart 10 from rolling or sliding off the track 220. Preferably, locking pins 234 and 236 are also placed on the track 220 to further secure the cart 10 onto the track 220. The track 220 is then rotated to a horizontal position and the locking pin 214 is replaced which locks the track 220 in the horizontal position of the motor vehicle 204. The flexible restraining straps 254, 256, which are attached to the upright supports 240, 242 by means of the connectors 250, 252 are then woven over or through the cart 10 and secured to the track 220 by means of the locking mechanisms 258, 260. At this point, the cart 10 is secure within the cart carrier 200 and available for transport (as illustrated in FIG. 6).

It is within the scope of the present invention to reverse the steps of the above technique in order to remove the cart 10 from the cart carrier 200.

The cart carrier 200 may be made of any materials known to the art which will support the cart 10. Examples of materials include aluminum, steel, wood, hard plastics and the like.

It is understood that the invention is not confined to the particular exemplary embodiments, construction and arrangement of parts herein illustrated and described, but embraces such modified forms thereof as come within the scope of the following claims.

What is claimed is:

1. A cart for carrying game, comprising:
   a. a frame having a front end and a back end and defining a wedge shape wherein the front end of the frame is narrower than the back end of the frame and wherein the frame forms a basket having a front end and a back end;
   b. a rear ground contacting structure attached to the frame beneath the frame between the front end of the frame and the back end of the frame and adapted to support the frame as the cart is moved across the ground;
   c. a front ground contacting structure attached to the frame forward from the front end of the frame such that the front end of the basket is lower than the back end of the basket and adapted to support the frame as the cart is moved across the ground;
   d. a support structure connected to the front end of the frame that extends over and beyond the front ground contacting structure and converges to form a single point at a front end of the support structure; and
   e. a handle structure formed at the back end of the frame, wherein the frame defines an axis extending from the front end to the back end of the frame and the handle structure extends from the basket substantially perpendicularly with respect to the axis, wherein the frame includes a center bar defining a backmost portion of the basket, and the handle structure comprises extensions of the center bar.

2. The cart of claim 1 wherein the frame includes:
   a. two elongated top frame members each having a front end and a back end and positioned in the same first plane such that the back ends of the top elongated frame members are farther apart than the front ends of the top elongated frame members;
   b. two elongated bottom frame members each having a front end and a back end and positioned in the same second plane beneath the first plane of the two elongated top frame members such that the back ends of the two elongated bottom frame members are farther apart than the front ends of the two elongated bottom frame members;
   c. a plurality of cross-members joining the two elongated top frame members to the two elongated bottom frame members to form the frame; and
   d. a plurality of center bars joining the two bottom frame members.

3. The cart of claim 1 comprising additionally a handle structure attached to the frame and positioned forward from the front ground contacting structure.

4. The cart of claim 1 comprising additionally a loop structure attached to the frame and positioned forward from the front ground contacting structure.

5. The cart of claim 1 wherein at least one of the rear ground contacting structure and the front ground contacting structure is a wheel.

6. The cart of claim 1 wherein the rear ground contacting structure is a wheel, wherein the cart further comprises a hand operated brake mechanism including a hand operated brake actuator mounted on the handle structure and coupled to a brake for the rear wheel.

\* \* \* \* \*